United States Patent
Yang et al.

(10) Patent No.: US 7,068,977 B1
(45) Date of Patent: Jun. 27, 2006

(54) METHOD AND SYSTEM FOR INTERFERENCE ASSESSMENT AND REDUCTION IN A WIRELESS COMMUNICATION SYSTEM

(75) Inventors: Weidong Yang, Richardson, TX (US); Guanghan Xu, Garland, TX (US)

(73) Assignee: Navini Networks, Inc., Richardson, TX (US)

( * ) Notice: Subject to any disclaimer, the term of this patent is extended or adjusted under 35 U.S.C. 154(b) by 223 days.

(21) Appl. No.: 10/269,225

(22) Filed: Oct. 11, 2002

(51) Int. Cl.
*H04B 17/00* (2006.01)

(52) U.S. Cl. .............. 455/67.13; 455/114.2; 455/562.1; 455/226.3; 455/273; 455/278.1

(58) Field of Classification Search .......... 455/560, 455/561, 560.1, 62–67.7, 67.11, 67.12, 67.13, 455/67.14, 114.2, 562.1, 226.1–226.4, 272–279.1
See application file for complete search history.

(56) References Cited

U.S. PATENT DOCUMENTS

| 5,251,216 A | * | 10/1993 | Marshall et al. ........... 370/337 |
| 5,375,123 A | * | 12/1994 | Andersson et al. ........ 370/333 |
| 5,507,007 A |   | 4/1996  | Gunmar et al. ............ 455/33.1 |
| 5,828,948 A | * | 10/1998 | Almgren et al. ........... 455/450 |
| 5,898,927 A | * | 4/1999  | Ishii et al. ................. 455/450 |
| 6,115,409 A | * | 9/2000  | Upadhyay et al. ......... 375/144 |
| 6,141,567 A | * | 10/2000 | Youssefmir et al. ...... 455/562.1 |
| 6,415,131 B1 | * | 7/2002 | Shohara ....................... 455/1 |
| 6,640,104 B1 | * | 10/2003 | Borst et al. ................ 455/450 |
| 2001/0055952 A1 | * | 12/2001 | Ficarra .................... 455/67.13 |

* cited by examiner

*Primary Examiner*—Charles Craver
(74) *Attorney, Agent, or Firm*—Preston Gates & Ellis LLP

(57) ABSTRACT

A method and system is disclosed for reducing interference in a wireless communication system utilizing an antenna array. The antenna array uses one or more signal channels for communicating with one or more mobile terminals. First, at least one channel is assigned as an empty channel in which no desired signal is carried so as to provide a representation of all relevant interference. Since the spatial characteristics of the empty channel and the regular signal channels should be very similar, the spatial signature of the signal channels is analyzed based on the interference received on the empty channel and the desired signals received on at least one signal channel. The analyzed spatial signature is then used for reducing the interference on all signal channels.

10 Claims, 5 Drawing Sheets

METHOD AND SYSTEM FOR INTERFERENCE ASSESSMENT AND REDUCTION IN A WIRELESS COMMUNICATION SYSTEM

BACKGROUND OF THE INVENTION

The present invention relates to wireless communication system in general, and more particularly, to a method and system for noise and interference reduction in a wireless communication system.

A wireless communication system involves a cellular structure where a call control and management device such as a base station communicates with a number of mobile terminals using a predetermined frequency band. For every terminal, signals other than those that are destined for it are considered to be noises or interferences fro other sources. The sources for the interferences can vary in a great deal. For example, each terminal may represent a potential source of interference for other mobile terminal in the same coverage area. Given the market acceptance of wireless communication devices, the number of wireless communications devices will probably only increase over the next several years. As such, the interference is likely to increase over time.

To limit the effects of the interference caused by the proliferation of wireless devices, an adaptive antenna array, also referred to as a smart antenna, having interference reduction or nulling capabilities may be used. The antenna array typically contains one or more antenna elements. During both the uplink and downlink communications, the receivers of base stations or terminals receive the combination of the signals of interest and interfering communication signals transmitted from other sources including persistent noises such as the thermal noise. With proper preprocessing such as channelization and CDMA despreading, it may be possible to enhance the signal of interest and suppress any interference and noise components. However, when the power levels of interference components are significantly higher than those of the signals of interest, a sufficiently high signal to interference and noise ratio is hard to obtain to assure a correct detection of the signals of interest or the underlying digital symbols. To alleviate the signal detection difficulty, numerous blind algorithms have been developed based on the unique signal properties such as finite-set, cyclostationarity, and constant modulus properties. Unfortunately, these algorithms may not be so effective due to the fact that many interfering signals are generated by other base stations or their corresponding terminals which use a same frequency band as or an overlapping frequency band with the one carrying the signals of interest, thereby inevitably possessing the same signal properties. Moreover, these algorithms are usually computationally intensive and require a significant number of data samples to have satisfactory performance.

What is needed is an improved method for reducing or nulling interferences for a wireless communication system.

SUMMARY OF THE INVENTION

A method and system for interference assessment and reduction is disclosed. The present disclosure describes a method and system for accurately detecting the characteristics of the interfering signals from relevant sources utilizing an antenna array. The antenna array uses one or more signal channels for communicating with one or more mobile terminals. First, at least one channel is assigned as an empty channel in which no desired signal is carried so as to provide a representation of all relevant interference. Since the spatial characteristics of the interference on the empty channel and the regular signal channels should be very similar, the spatial signature of the signal channels is analyzed based on the interference received on the empty channel and the desired signals received on at least one signal channel. The analyzed spatial signature is then used for reducing the interference on all signal channels.

For example, in CDMA based wireless communication systems, in order to better estimate the interfering signals, a base station designates a code channel in which the expected communications between the base station and a particular terminal is withheld while every other communication code channels are still used as normal. As such, the interfering signals can be well exposed and the characteristics can be accurately detected in the designated code channel. Based on the detected characteristics of the interfering signals, the base station can specifically design beamforming mechanism or other means to cancel or minimize the impact of such interference during regular uses of all code channels.

DESCRIPTION OF THE PREFERRED EMBODIMENT

The present disclosure introduces a unique inactive code channel for each antenna array such that only the interferences generated from relevant sources will be better estimated due to the lack of regular data signals. The characteristics of all interfering signals are thus captured and used for canceling such signals in other communications using other code channels.

Figure 1:
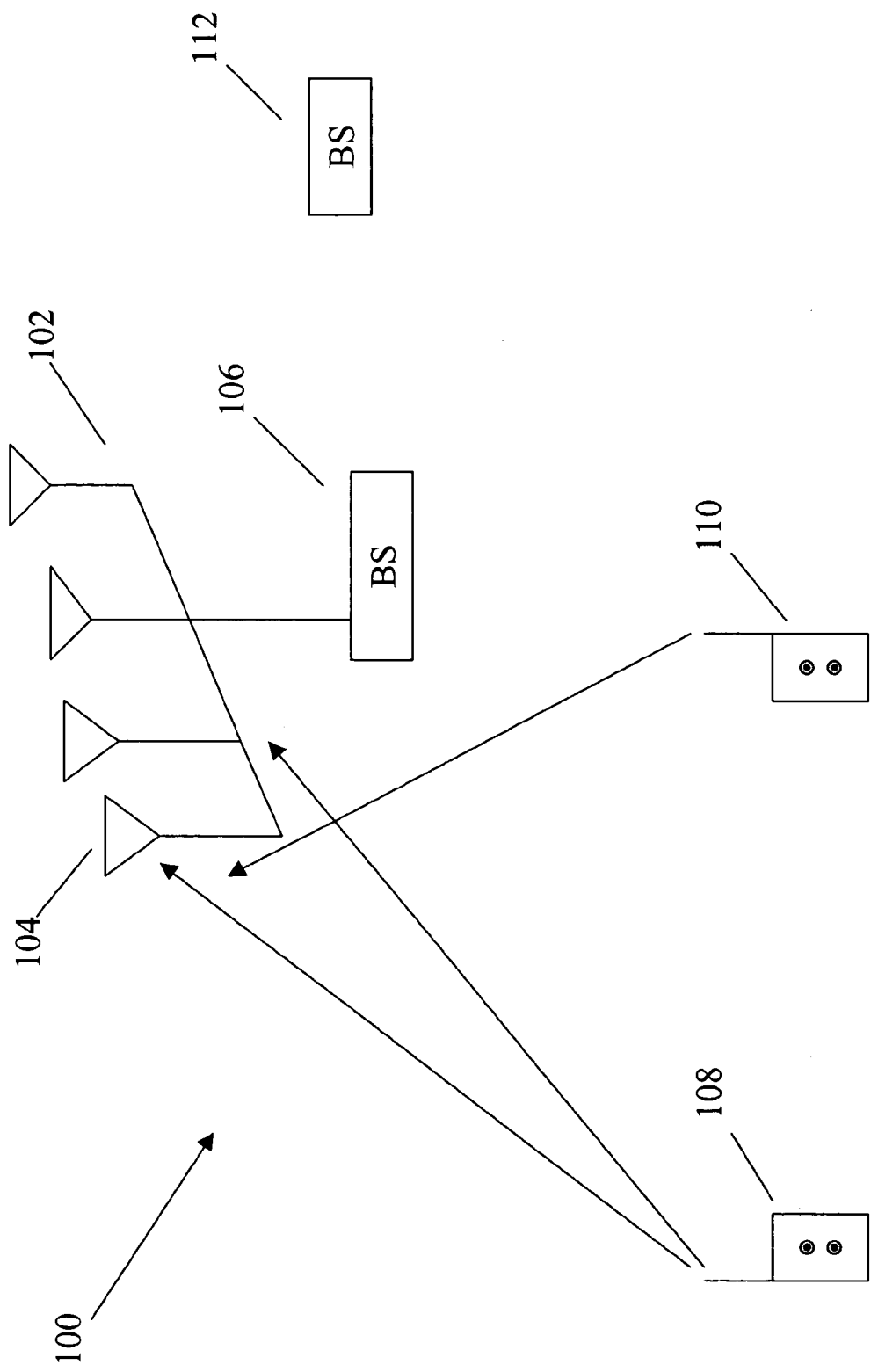
FIG. 1 illustrates wireless communication system utilizing an antenna array.

FIG. 1 shows a wireless communication system 100 having an adaptive array antenna 102 for receiving, transmitting, and processing a wireless transmission signal. The array 102 includes m antenna elements 104, each of which may be coupled to a separate train of signal processing equipment with a base site such as a base station (BS) 106. Each train of signal processing equipment includes components such as a radio frequency receiver and analog-to-digital converter, subchannel demodulator, or symbol synchronizer. In the conventional art, the symbol synchronizer controls a plurality of sampling devices to sample the signal at a rate that is determined according to a conventional symbol rate sampling algorithm.

When a plurality of signals are received by the antenna elements 104 of the array 102, each of the signals received by the array elements 104 constitutes a distinct and different superposition or summation of different reflections of an original signal transmitted by, for example, one of the mobile terminals 108. In the ideal situation, the received signal may contain a direct "line of sight" component that is not reflected off of any surfaces so that the received signal at each array element 104 may include an original signal. In short, the received signal typically is a summation of a plurality of reflections of the original signal, or a summation of the original signal and the plurality of reflections of the original signal. In addition, the signal received by each antenna element 104 also contains interferences from other mobile terminals such as terminal 110, or base sites 112 as well as random noises. In the discussion below, the signal from the mobile terminal 108 that the antenna array 102 is attempting to receive will be referred to as a "desired signal" and the signals from other mobile terminals and base sites will be referred to as "interference signals". As it is understood in the industry, after receiving the plurality of signals by each of the antenna elements 104, the signals are then processed by the train of signal processing equipment associated with each element. In one example, certain weight calculator determines weights to be supplied to limit the effects of interference and noise.

When a mobile terminal transmits a signal to the base station of the communication system 100, the received signals at different antenna elements 104 of that antenna array 102 can be mathematically modeled as a vector multiplied by the initially sent signal. That vector is usually determined by various factors including the location of the mobile terminal, the propagation environment, the configuration of the antenna array elements, carrier frequency, etc. These factors are collectively referred to as the spatial signature of the mobile terminal. Similarly, the concept of spatial signature can apply to any transmission device. In the following discussion, although a mobile terminal may be used as one example of the transmission device, it is not limited to a mobile terminal such as terminal 108 or 110 of FIG. 1, and can be any signal transmission source. Moreover, in one example of the present disclosure, a synchronous CDMA communication system will be used to illustrate the invention, but the principles thereof can be applied to TDMA, OFDM, FDMA, or any similar systems.

In a synchronous CDMA system, mobile terminals are assigned with orthogonal spreading codes known as code channels, which separates the signals in the code domain. The transmission time for signals in these code channels is adjusted so the signals sent from a mobile terminal (e.g., terminal 108) may arrive at the antenna array 104 at almost the same time. It is understood that if the timing accuracy is not maintained, then signals transmitted from other terminals will pose interference. As mentioned earlier, transmissions from other cells and other systems also lead to interference with the desired terminal's signal at the antenna.

The antenna array 102 along with the base station 106 is expected to provide solutions to suppress interferences. From the perspective of the antenna array, since each mobile terminal has its own unique spatial signature, transmission devices at different locations will have different spatial signatures.

As it is known in the art, CDMA technology divides a radio spectrum into wideband digital radio signals with each signal waveform carrying several different coded channels, while each coded channel is identified by a unique channel code. As the antenna receives the coded signals, the processing mechanism separates the channels by correlating or matching signals with the proper channel code sequence and enhancing the correlated one without enhancing others. The majority of code channels are used for voice or data communications, but a small number of code channels are used for control purposes such as the pilot, synchronization, paging, and access channels.

Figure 2:
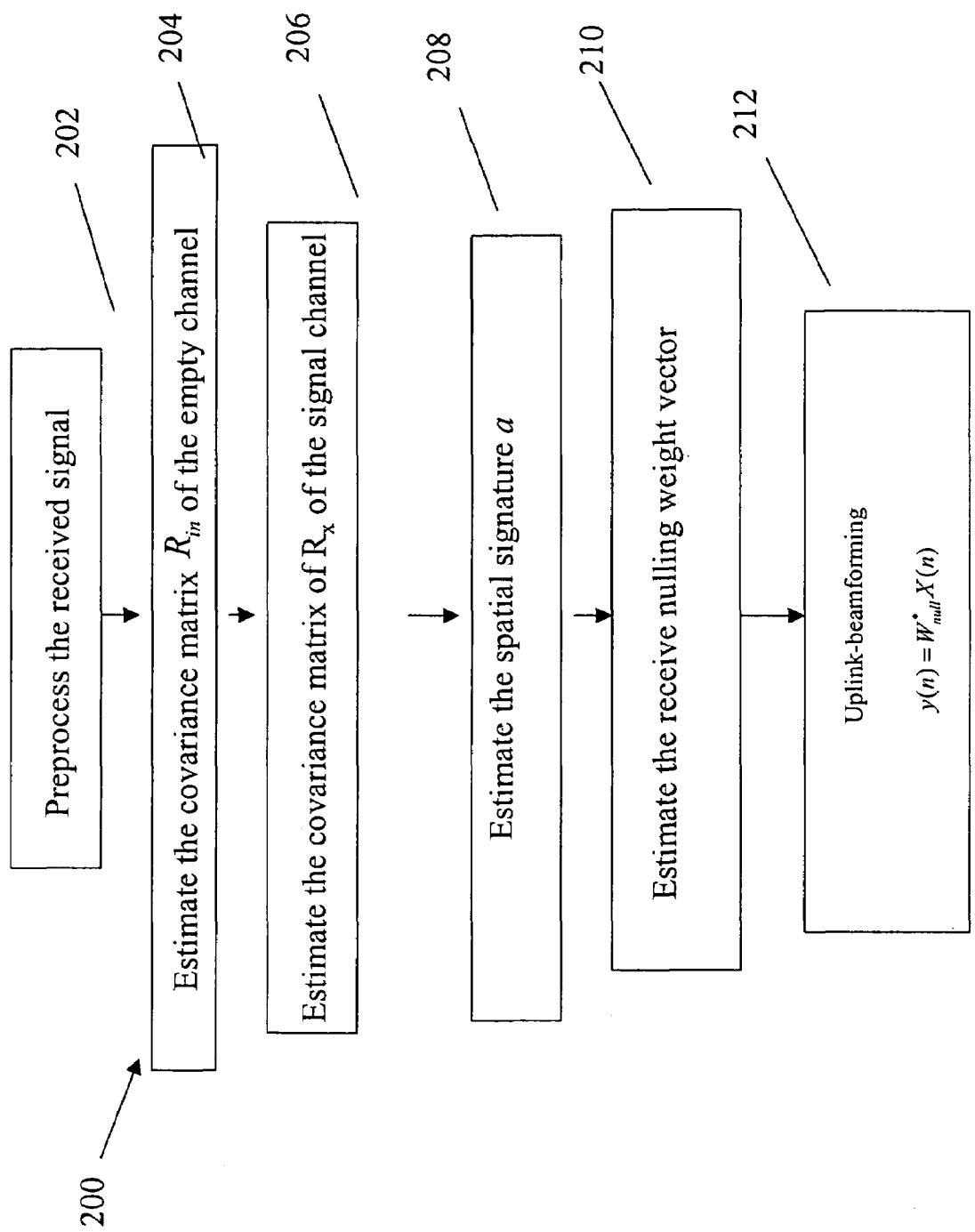
FIGS. 2–5 illustrate four flow diagrams for estimating and reducing the interference according to different embodiments of the present disclosure.

FIG. 2 is a flow diagram 200 illustrating one example of the present disclosure for interference assessment and reduction. In order to accurately assess the interference, one or more code channels are preserved for signal quality control purposes only (referred to as "empty channels"). Unlike the other code channels, these empty channels will not carry any desired signal at all so that the information represented thereon is merely unneeded interference including noises. The characteristics of the exposed interference can then be detected and used for the elimination or reduction thereof on other code channels. For example, using the empty channel, the base station and a particular terminal do not transmit signals at all or transmit signals at power levels that are detectably lower than normal to facilitate the assessment of the interference so that it can be dealt with more efficiently.

For the purpose of illustration, it is assumed that only one code channel is reserved as the empty channel, while one code channel is assigned for each mobile terminal (e.g., the kth terminal is assigned with the kth code channel).

In step 202, for example, preprocessing such as the despreading process is done to extract each code channel symbols from a wideband signal. Similarly, if the multiple access scheme is using the Orthogonal Frequency Division Multiple Access (OFDM) technology, a fast Fourier transform (FFT) is performed to isolate the signal into multiple tones. For Frequency Division Multiple Access (FDMA) signals, filtering mechanism are used to decompose a wideband signal into multiple narrow-band signals. For Time Division Multiple Access (TDMA) signals, preprocessing simply means to separate the signal into different groups based on the time slots they occupy. In step 204, the covariance matrix $R_{in}$ of the empty channel is estimated. Then, in step 206, a sample covariance matrix $R_x$ of a signal carrying code channel is then calculated using data vectors obtained as $R_x=[X(1)X^*(1)+X(2)X^*(2)+ \ldots +X(N)X^*(N)]/N$, where $X(n)$ is the data vector after preprocessing at time index "n" and N is the number of data vector samples used. It is understood that $X(n)=as(n)+i(n)$, wherein $s(n)$ represents the desired signal carried in the code channel and $i(n)$ represents the noise and a represents the spatial signature. In step 208, the signal spatial signature is estimated based on $R_x$ and $R_{in}$. One method is to apply the generalized eigendecomposition of $R_x$ and $R_{in}$. For illustration purposes, it is assumed that $[\lambda_i, e_1]$ is the i-th largest generalized eigenvalue and its corresponding generalized eigenvector of the matrix pencil $\{R_x, R_{in}\}$, such that $R_x e_i = \lambda_1 R_{in} e_i$ (in this case, $a=e_1$).

After the spatial signature is estimated, an estimation of a receive/uplink beam forming vector $w_{null}$ is done based on a in step 210. One method of finding $w_{null}$ is to let $w_{null} = R_{in}^{-1}a$. If $R_{in}$ is ill conditioned (e.g., the condition number is larger than certain threshold), $R_{in}^{-1}$ will be replaced by the pseudo inverse of $R_{in}$, i.e., $R_{in}\#$. With the beamforming vector $w_{null}$, a receive beam forming is performed accordingly in step 212 by the following equation, $y(n)=w_{null}^*x(n)$, where $y(n)$ is the n-th sample of the beamformed result and $x(n)$ is the n-th sample of the data vectors in the signal channel, and where * denotes the complex conjugate of the vector $w_{null}$. The communication signals received are then appropriately demodulated based on $y(n)$. Similarly, a transmit/downlink beam forming vector can be estimated based on a receive beam forming vector and calibration vectors.

Figure 3:
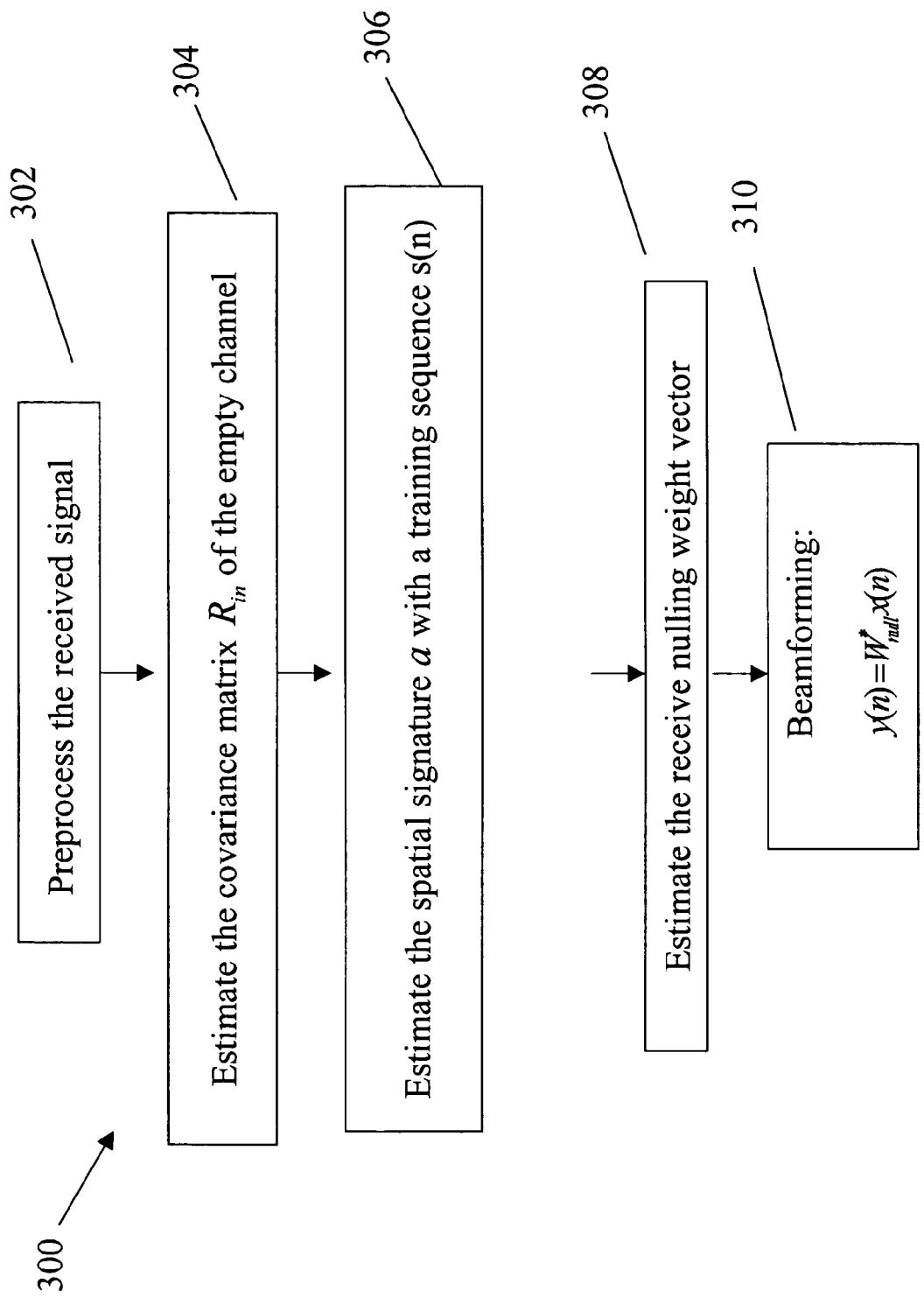

FIG. 3 is a flow diagram 300 illustrating another embodiment for estimating and reducing the interferences. The flow diagram 300 is similar to the flow diagram 200 of FIG. 2 except that steps 206 and 208 are now replaced by step 306 in which the spatial signature is estimated with the assistance of a training sequence $s(n)$ in the code channel. Steps 302, 304, 308 and 310 matches the steps 202, 204, 210, and 212 of FIG. 2. Since the wireless communication system is full aware of what's in the training sequence, it would be easier to detect the spatial signature and assess other interference.

Figure 4:
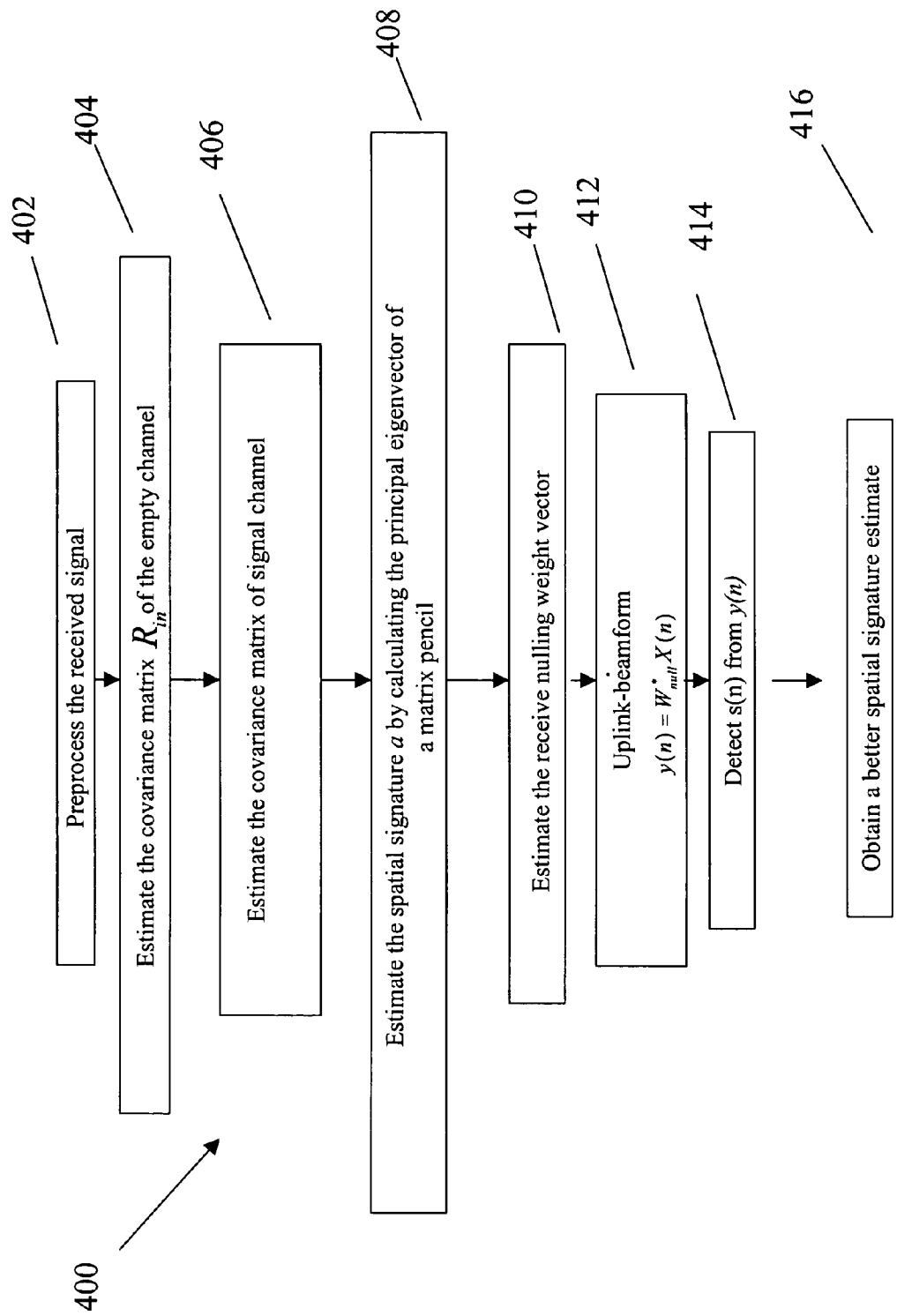

FIG. 4 is a flow diagram 400 illustrating another embodiment of the present disclosure. Steps 402–412 are the same as steps 202–212 respectively, and then in step 414, the signal s(n) of the code channel is derived from y(n). Once the s(n) is derived, in step 416, it is plugged back into formula $$a = \sum_{n=1}^{N} s^*(n)X(n) \bigg/ \sum_{n=1}^{N} |s(n)|^2$$

to get a better spatial signature to be used for other channels.

Figure 5:
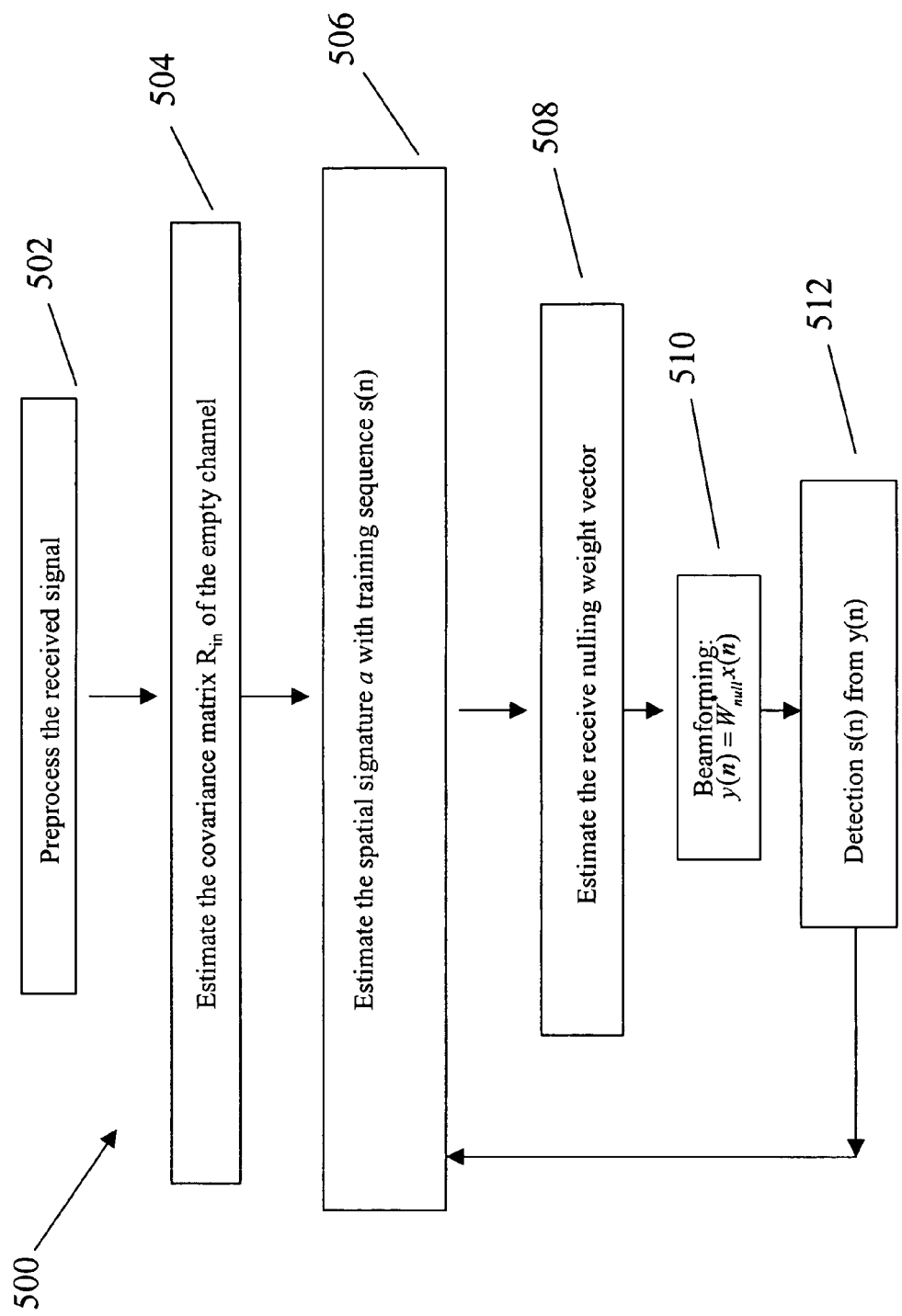

FIG. 5 is another flow diagram 500 illustrating one other embodiment of the present disclosure. The diagram 500 is similar to the diagram 300 except that after y(n) is obtained, the signal s(n) of the signal channel is derived from y(n) in step 512. The s(n) is then fed back to step 506 where the spatial signature a is better estimated using the training sequence. In another example, the s(n) can be cached temporarily after step 512 so that when in a next round of derivation, a new s(n) can be compared with the stored s(n). A tolerance between these two s(n) values can be set up to decide whether the new s(n) needs to be fed back to step 506. Therefore, the convergence of the values of s(n) in different rounds of estimation helps to obtain the best spatial signature for interference reduction. It is also possible that the repetition through the feedback loop formed by steps 506–512 can be set at a predetermined number by the operator.

Moreover, after the estimation of the spatial signature is finally obtained using methods described above, the spatial signature of the current frame is compared with ones obtained in the previous frames according to some predetermined criteria to keep it updated and accurate in an interference environment.

As described above, the interference reduction taking advantage of the empty channels can be implemented through both the base station and the terminals. These two ends of the communications can cooperate to make channel assignment and interference reduction more efficient. Since conventionally, the base station has more processing capacity than the terminal, estimation of the profile of the interference can be done there. However, as the terminal gets more intelligent, a lot of the analysis can also be done on the terminal. The improved beam forming mechanism can then be also implemented on the terminal side.

The above disclosure provides several different embodiments, or examples, for implementing different features of the disclosure. Also, specific examples of components, and processes are described to help clarify the disclosure. These are, of course, merely examples and are not intended to limit the disclosure from that described in the claims. For example, the example given above uses CDMA technology as an illustration wherein the empty channel is a predetermined code channel. If the wireless communication system is using Time Division Multiple Access technology, the empty channel can be a time slot. Similarly, the empty channel can be frequency bins for OFDM technology based systems and subcarriers in FDMA technology based systems.

While the disclosure has been particularly shown and described with reference to the preferred embodiment thereof, it will be understood by those skilled in the art that various changes in form and detail may be made therein without departing from the spirit and scope of the disclosure.

What is claimed is:

1. A method for reducing interference in a wireless communication system utilizing an antenna array, the antenna array using at least one or more channels for communicating with one or more mobile terminals, comprising:

assigning at least one channel as an empty channel in which no desired signal is carried so as to provide a representation of all relevant interference;

analyzing a spatial signature of the channels based on the interference received on the empty channel and the desired signals received on at least one signal channel; and reducing the interference on the signal channel by utilizing the analyzed spatial signature and the representation of all relevant interference, wherein the analyzing further includes:

estimating data covariance matrices, $R_x$ and $R_{in}$, wherein $R_{in}$ is a covariance matrix of the empty channel and the $R_x$ is a covariance matrix of the signal channel;

estimating the spatial signature of the signal channels by finding a generalized principal eigenvector of a matrix pencil $\{R_x, R_{in}\}$; and obtaining a nulling weight vector for the signal channel based on the spatial signature and $R_{in}$.

2. The method of claim 1 further includes:

determining a beamforming vector based on the nulling weight vector;

detecting the desired signals from the beamforming vector;

further determining the spatial signature; and repeating the above steps until a predetermined condition is satisfied.

3. The method of claim 2 wherein the predetermined condition is the convergence of the detected desired signals.

4. The method of claim 2 wherein the predetermined condition is a predetermined number of iterations.

5. A wireless communication system for reducing interference utilizing an antenna array, the antenna array using one or more signal channels for communicating with one or more mobile terminals, comprising means for:

assigning at least one channel as an empty channel in which no desired signal is carried so as to provide a representation of all relevant interference;

analyzing a spatial signature of the signal channels based on the interference received on the empty channel and the desired signals received on at least one signal channel; and reducing the interference on the signal channels by utilizing the analyzed spatial signature and the representation of all relevant interference, wherein the analyzing further includes:

estimating data covariance matrices, $R_{in}$ and $R_x$, wherein $R_{in}$ is a covariance matrix of the empty channel and $R_x$ is a covariance matrix of the signal channel;

estimating the spatial signature of the signal channel by finding a generalized principal eigenvector of a matrix pencil $\{R_x, R_{in}\}$; and obtaining a nulling weight vector for the signal channels based on the spatial signature and $R_{in}$.

6. The system of claim 5 further includes:

determining a beamforming vector based on the nulling weight vector;

detecting the desired signals from the beamforming vector;

further determining the spatial signature; and repeating the above steps until a predetermined condition is satisfied.

7. The system of claim 6 wherein the predetermined condition is the convergence of the detected desired signals.

8. The system of claim 6 wherein the predetermined condition is a predetermined number of iterations.

9. The system of claim 6 wherein the obtaining further includes using a training sequence in the signal channel for better estimating the spatial signature.

10. A method for reducing interference in a wireless communication system utilizing an antenna array, the antenna array using one or more channels for communicating with one or more mobile terminals, comprising:

assigning at least one channel as an empty channel in which no desired signal is carried so as to provide a representation of all relevant interference;

analyzing a spatial signature of the channels based on the interference received on the empty channel and signals of a training sequence received on at least one signal channel; and reducing the interference on the signal channels by utilizing the analyzed spatial signature and the representation of all relevant interference, wherein the analyzing further includes:

estimating the spatial signature of the signal channel by finding a generalized principal eigenvector of a matrix pencil $\{R_x, R_{in}\}$;

obtaining a nulling weight vector for the signal channel based on the spatial signature and the covariance matrix of the signal channel;

determining a beamforming vector based on the nulling weight vector;

detecting the signals of the training sequence from the beamforming vector; and repeating the above four steps until a predetermined condition is satisfied.

* * * * *